(12) United States Patent
Pastuch

(10) Patent No.: US 6,831,222 B2
(45) Date of Patent: Dec. 14, 2004

(54) WEATHERPROOF JUNCTION BOX

(76) Inventor: Darrell Pastuch, 391 W. Riverside Dr., Tequesta, FL (US) 33469

(*) Notice: Subject to any disclaimer, the term of this patent is extended or adjusted under 35 U.S.C. 154(b) by 0 days.

(21) Appl. No.: 10/639,018

(22) Filed: Aug. 12, 2003

(65) Prior Publication Data
US 2004/0074657 A1 Apr. 22, 2004

Related U.S. Application Data

(60) Provisional application No. 60/403,232, filed on Aug. 14, 2002.

(51) Int. Cl.[7] .................................................. H05K 5/00
(52) U.S. Cl. ............................. 174/17 CT; 174/35 GC; 174/58; 174/65 R
(58) Field of Search .................. 174/17 CT, 35 GC, 174/58, 63, 65 R, 50.59, 52.3; 220/3.2, 4.02; 277/648

(56) References Cited

U.S. PATENT DOCUMENTS

| | | | | |
|---|---|---|---|---|
| 4,365,108 A | * | 12/1982 | Bright | .......................... 174/50 |
| 4,449,015 A | * | 5/1984 | Hotchkiss et al. | ........ 174/138 F |
| 4,959,506 A | * | 9/1990 | Petty et al. | ................ 174/65 R |
| 5,783,774 A | * | 7/1998 | Bowman et al. | ............... 174/48 |

* cited by examiner

Primary Examiner—Dhiru R. Patel
(74) Attorney, Agent, or Firm—Christopher J. Whewell

(57) ABSTRACT

Provided herein is a junction box in which an electrical conductor may be protected from wet surroundings which includes an enclosure portion and a cap portion. The enclosure portion has an outer surface, and further includes a plurality of conduit-receiving bosses and a means for anchoring said enclosure portion to the earth. The cap portion includes a hole disposed through its surface, and the enclosure portion and the cap portion each include a portion each of a complementary closure means which cooperatively function to sealingly attach the cap portion to the enclosure portion to provide an enclosure/cap construction, wherein said construction further includes a gasket means for sealing the inner chamber defined by said cap and enclosure from the external surroundings in a waterproof fashion. A junction box according to the invention is especially well suited for subterranean locations.

19 Claims, 7 Drawing Sheets

WEATHERPROOF JUNCTION BOX

CROSS-REFERENCES TO RELATED APPLICATIONS

This application claims the benefit of U.S. Provisional Application No. 60/403,232 filed Aug. 14, 2002, currently still pending, the entire contents of which are herein incorporated by reference.

TECHNICAL FIELD

This invention relates generally to electrical junction boxes, that is, enclosures in which are housed connections or splices between two or more electrical conductors, such as wires. More particularly, it relates to electrical junction boxes which are especially well-suited for subterranean use.

BACKGROUND INFORMATION

Generally, electrical junction boxes are well known in the art. Such boxes are used in residential, industrial and commercial installations and in such instances, are typically of a relatively small size e.g. 4" in diameter and 1" to 3" in depth. They are normally placed in ceilings, walls, flooring, etc. to receive spliced conduits, valved conduits and other joints. Several examples of this type of junction box are known in the art as exemplified by U.S. Pat. Nos. 3,873,757; 4,244,484; 4,266,266; 4,542,437; 4,654,470; 5,382,752; and 5,541,363.

Junction boxes are also used in major installations in underground construction, where large cables are joined for high voltage lines. In such cases, the junction boxes are many times the size of the above type and may, for example, be 2' to 4' in diameter and 1' to 4' high. In the latter case, the construction and structural characteristics required for such junction boxes are significantly different than the small residential or like installations. Where such junction boxes are used exteriorly, they may be buried in the ground or mounted on a slab construction which is subsequently covered with earth, sand or the like. In addition to other factors, such junction boxes must obviously meet requirements for exposure to outdoor criteria e.g. water resistance, etc.

In the case of outdoor junction boxes, for large electrical installations, one possibility has been to construct a fixed enclosure of suitable material e.g. concrete, metal housings or the like. Apart from the cost effectiveness of such construction, there are also other considerations such as transportation, installation, etc. which add to the total economic factor for such apparatus. It would be desirable if there could be provided a junction box structure and apparatus which can readily be mounted in a subterranean location, and which can be manufactured in an economic and simple manner while at the same time providing a unit which can be readily secured in place under different locations and circumstances.

Conventionally the known junction boxes include clamps to fasten a cable therein entering the box. Typically, the boxes include "knockouts" to permit reception of a conduit within the box, as such knockouts are well known in the art. Further, many known junction boxes are made from an electrically-conductive material which requires that electrical conduits be grounded thereto.

SUMMARY OF THE INVENTION

The present invention provides a junction box useful for containing electrical connections comprising a substantially cylindrical enclosure portion having a bottom surface portion, a wall portion having an inner surface and an outer surface. The wall portion defines an outer diameter, and the wall portion further comprises a top edge portion. The enclosure portion further comprises: i) a plurality of conduit receiver bosses having knock-out provisions disposed on the bottom surface portion; ii) a mount boss disposed on the bottom surface portion; iii) a plurality of protruding pins disposed on the outer surface of the wall portion of the enclosure portion; and iv) a seal means annularly disposed about the wall portion at the top edge portion of the enclosure. There is a cap portion which comprises a cylindrically-shaped inner bore which is larger than the outer diameter of the wall of the enclosure portion. The cap portion includes a plurality of angled channels on its inner surface which are adapted to receive the protruding pins. The cap portion is disposed about the enclosure portion so that the protruding pins are disposed within the angled channels.

DETAILED DESCRIPTION

Figure 1:
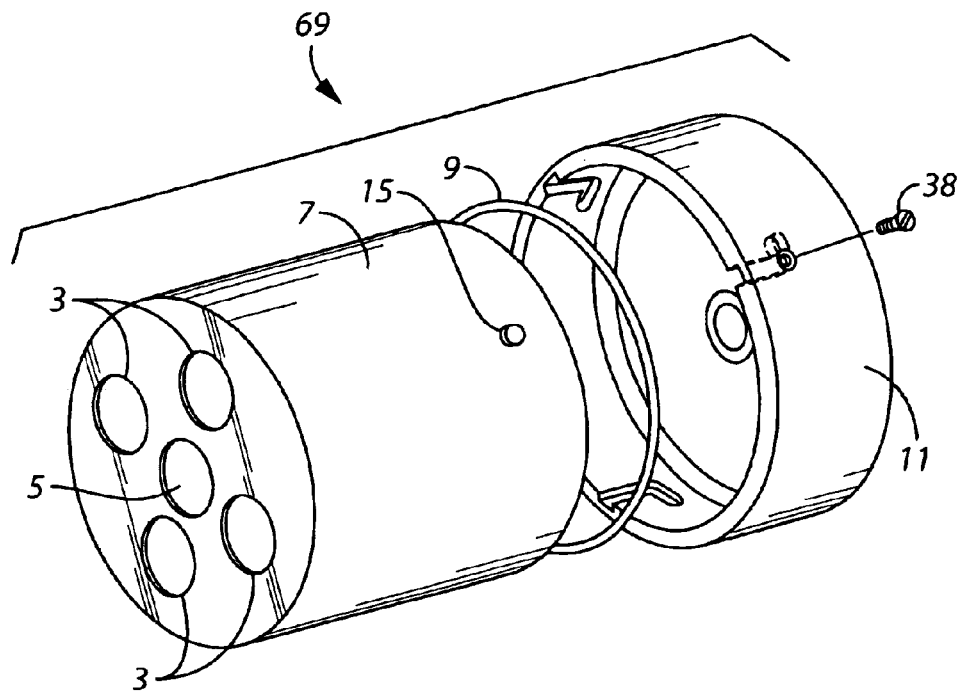
FIG. 1 is an exploded perspective view of a junction box according to one form of the invention.

Referring to the drawings and initially to FIG. 1 there is shown a junction box 69 according to the present invention in an exploded view showing its various components including the enclosure portion 7, cap portion 11, and o-ring seal 9. The enclosure portion includes a plurality of conduit receiver bosses 3 at its lower surface, which bosses are adapted to receive an electrical conduit, which preferably comprises polyvinyl chloride ("PVC") conduit, and the connection is made between the conduit and the enclosure portion of the junction box using conventional PVC cement, although it is entirely within the scope of the invention to utilize conduits made from other materials and other known means for connecting the conduit to the enclosure portion. Each of the conduit receiving bosses includes a "knock-out" portion, as later described in more detail, and as such knock-outs and their use are well known to those skilled in the art. The conduit receiver bosses 3 are cylindrically-shaped depressions having a floor portion, wherein the floor portion comprises the knockout. The diameter of the cylindrically-shaped depressions is only slightly larger than the outside diameter of a conduit which it is intended to receive, i.e., ½", ¾", 1", etc. outer diameter PVC conduit. In actual use, a selected knockout portion is knocked out, and the end portion of a conduit is inserted onto the cylindrically shaped depression which comprises the boss so as to open a passageway between the interior of the junction box 69 and the interior of the conduit which is inserted into one of the conduit receiver bosses 3.

Figure 2:
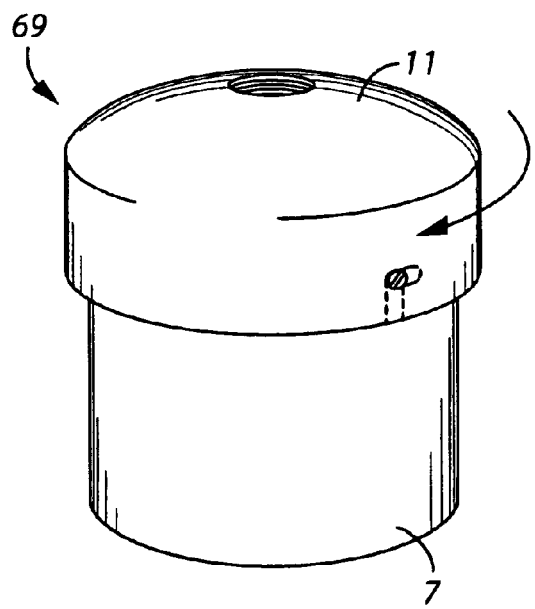
FIG. 2 is a side perspective view of a junction box according to one form of the invention.

FIG. 2 shows a perspective view of an assembled junction box 69 according to the invention, showing the enclosure portion 7 and cap portion 11 in their respective locations. The arrows in FIG. 2 show the direction that the cap 11 is moved in order to secure it about the enclosure portion 7—first downward onto the enclosure portion, and then twisted to cause the cap to lock on the enclosure.

Figure 3:
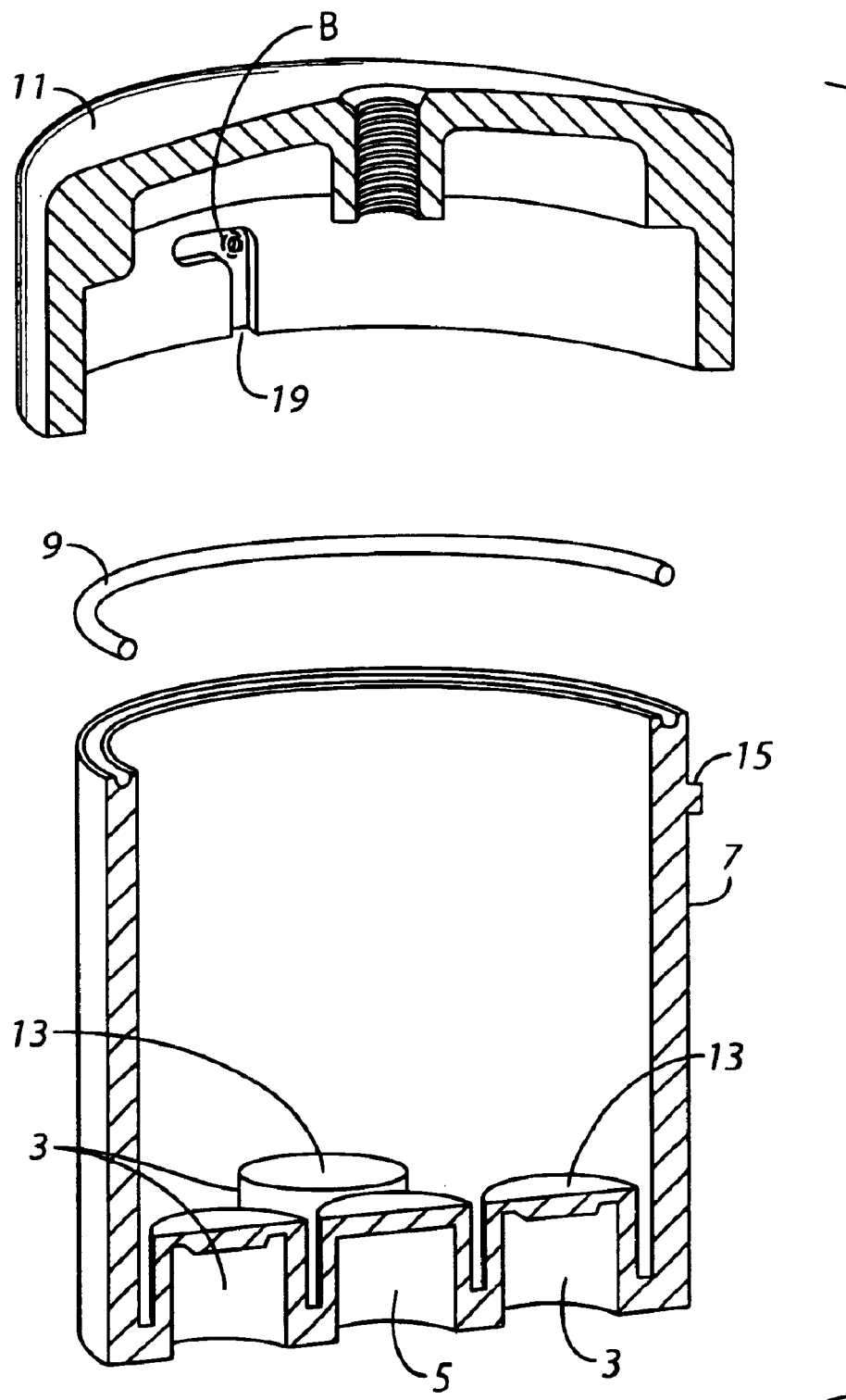
FIG. 3 is a cutaway exploded perspective view of a junction box according to one form of the invention.

FIG. 3 shows a side cutaway view of the components of a junction box according to the invention, including the cap portion 11, o-ring 9, and enclosure portion 7. As mentioned, the enclosure portion includes conduit receiver bosses 3, which are generally cylindrically-shaped insets in the bottom surface of the enclosure portion which are of slightly larger inner diameter than the outer diameter of the conduit they are adapted to receive. The conduit receiver bosses 3 each include a knock out portion 13 at their uppermost surface, the purpose of the knock out being an optional removal of such surface 13 when it is desired by the user to have an electrical conductor pass from outside of the enclosure to the inside of the enclosure. As is well known in the art, when a user decides to employ a particular hole, in this instance being a conduit receiver boss 3, then the user merely knocks out the knock out, which transforms the boss into an open passageway. Disposed centrally on the floor portion is a center mount boss 5, which in one preferred form of the invention does not contain a knock out portion at its upper surface. The enclosure portion 7 includes a plurality of protruding pins 15 disposed on the outer surface of the enclosure portion 7 near the top upper rim of the enclosure. These protruding pins 15 are adapted to lockingly engage within angled channels 19 in the cap portion to secure the cap portion 11 onto the enclosure portion 7. The protruding pins are preferably either circular, square, or rectangularly shaped as viewed from the side of the enclosure portion, although the use of any other geometry is within the scope of the invention. This locking arrangement is reminiscent of tail lamp bulbs for automotive applications in which the light bulbs comprise a plurality of protruding pins on their metal sheath portion, which lockingly engage within a socket on the vehicle by virtue of a twisting motion applied by the installer, as such arrangement on automobiles is known in the art.

The cap portion 11 includes a plurality of angled channels 19 which are sufficiently located about the inner surface of the sidewall portion of the cap portion 11 to be adapted to receive the protruding pins 15 which are disposed on the exterior of the enclosure, so as to provide a joining of the enclosure portion with the cap portion by a twisting the two pieces together, as indicated by the arrows in FIG. 2. Having an o-ring 9 seal disposed between an interior surface of the cap portion 11 and enclosure portion 7 provides a weatherproof seal, thus shielding the interior of the enclosure from the outside elements. In one embodiment, the o-ring seal 9 is disposed in an annular groove 17 on the top surface of the enclosure 7. In another embodiment, the o-ring seal is annularly disposed about the outer surface of the enclosure near its top end portion on a ledge.

Figure 4A:
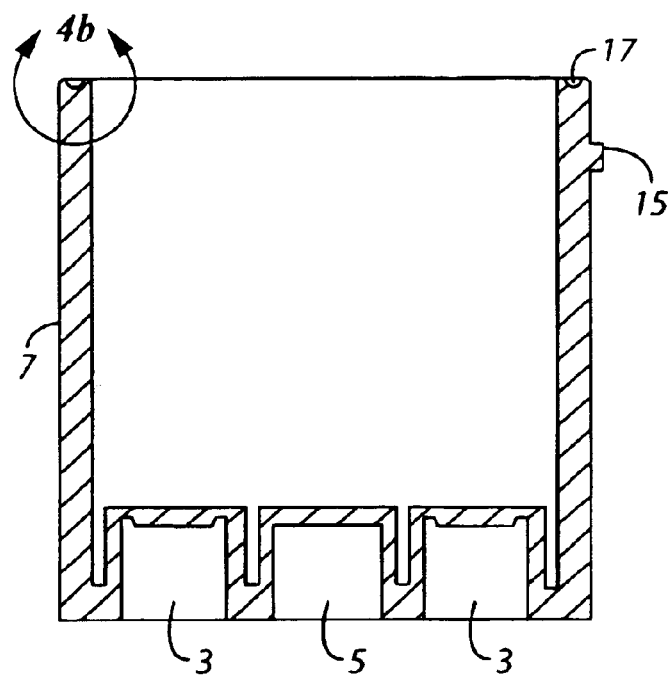
FIG. 4A is a side cutaway view of the enclosure portion of a junction box according to one form of the invention.
Figure 4B:
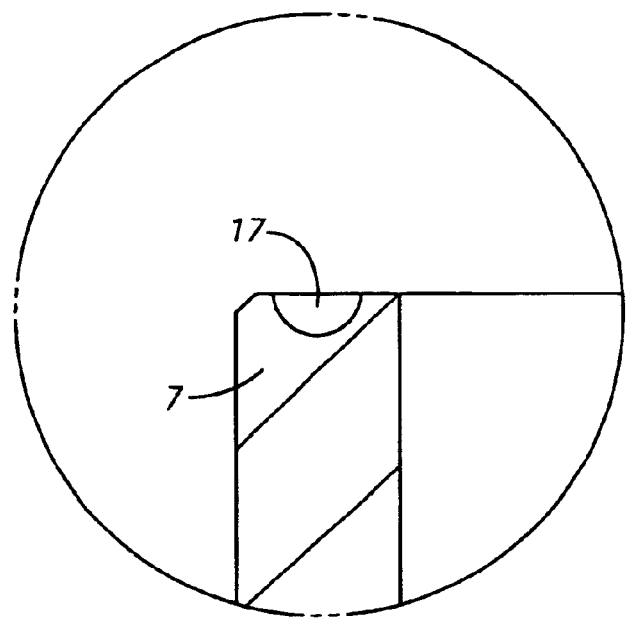
FIG. 4B is a magnified side cutaway view of the shoulder portion of the enclosure portion of a junction box according to one form of the invention.

FIG. 4A shows a side cutaway view of the enclosure portion 7, showing pin protrusion 15, conduit receiver bosses 3, center mount boss 5, and detail A, which shows in more detail in FIG. 4B the annular o-ring groove feature 17 on the upper surface of the enclosure portion 7.

Figure 4C:
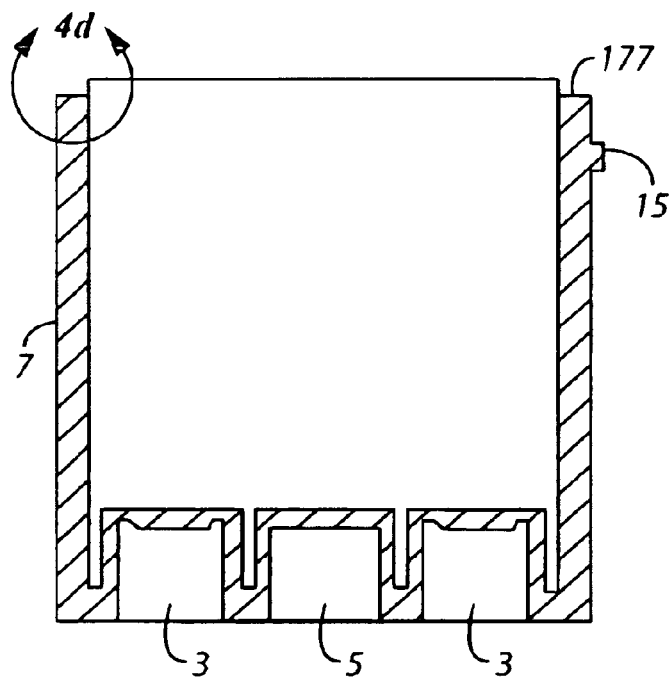
FIG. 4C is a side cutaway view of the enclosure portion of a junction box according to an alternate form of the invention.
Figure 4D:
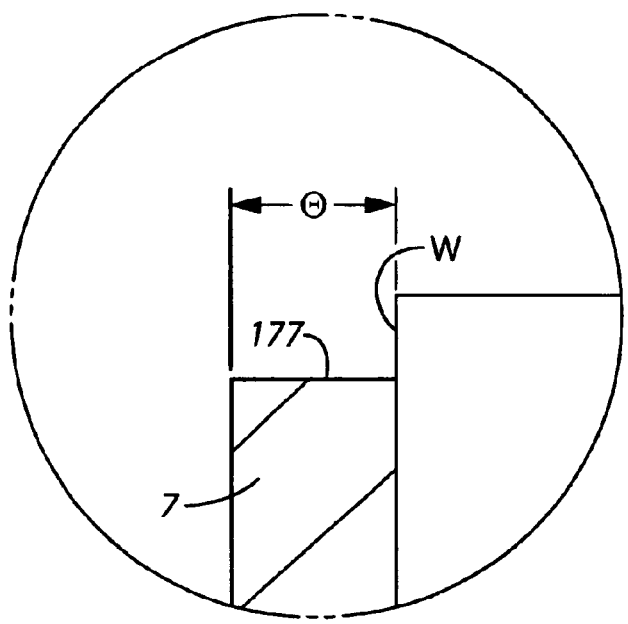
FIG. 4D is a magnified side cutaway view of the shoulder portion of the enclosure portion of a junction box according to an anlternate form of the invention.

FIG. 4C shows a side cutaway view of and alternative form of the enclosure portion 7, showing pin protrusion 15, conduit receiver bosses 3, center mount boss 5, and detail A, which shows in more detail in FIG. 4D the annular o-ring receiving annular ledge feature 177 near the upper surface of the enclosure portion 7. As shown in FIG. 4C, the o-ring receiving ledge feature 177 is a groove which extends annularly about the top portion of the enclosure 7 of the invention. Detail A in FIG. 4D shows the wall W which is the surface that the o-ring seal is intended to reside upon, by virtue of the o-ring being elastomeric and having an inner diameter which is slightly smaller than the outer diameter of the wall W, so as to provide for the o-ring being biased to hug the wall portion W. The wall portion W is circular as viewed from above, just as is the enclosure 7 as a whole. The outside diameter of the enclosure portion is greater than the diameter of the cylindrical shape defined by wall W by an amount equal to two times the dimension θ in FIG. 4D. The ledge 177 and groove 17 may each be a machined feature, or may be cast-in during manufacture, such as in the case when the enclosure portion is comprised of PVC.

Figure 5:
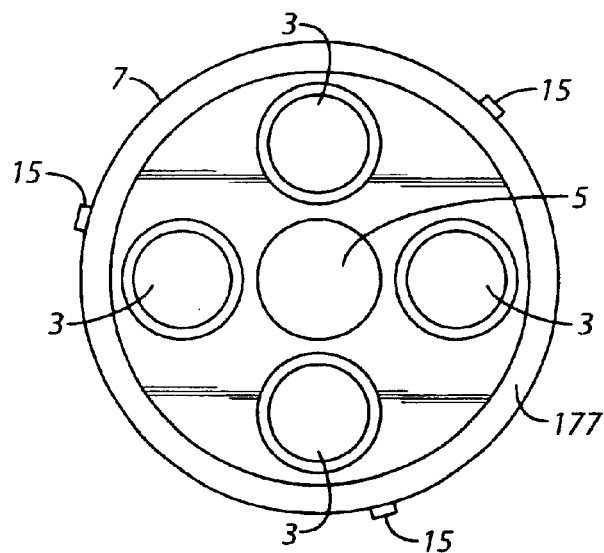
FIG. 5 is an overhead view of the enclosure portion of a junction box according to one form of the invention.

FIG. 5 shows a top perspective view of the enclosure portion 7 according to one preferred form of the invention, including the protruding pins 15, conduit receiver bosses 3, ledge 177, and center mount boss 5.

Figure 6A:
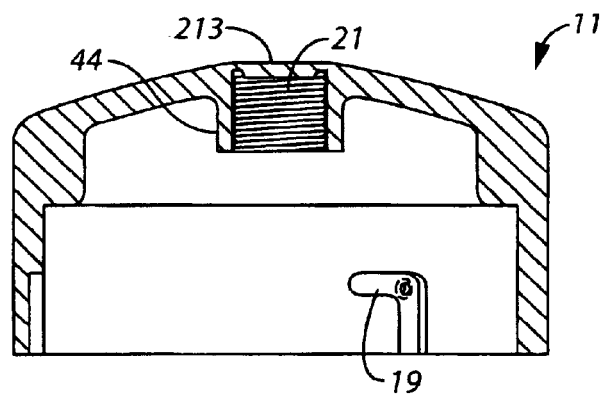
FIG. 6A is a side cutaway view of the cap portion of a junction box according to one form of the invention.

FIG. 6A is a side cutaway view of the cap portion 11 of a junction box according to a preferred form of the invention, showing the preferred shape of the angled channel portion 19, which is a depression in the interior surface of the cap portion 11, and a top hole 21, which optional top hole may contain a knock out 213 at its top surface coincident with the top surface of the cap portion in one form of the invention. An alternative embodiment of the invention employs threads on the inner surface of the walls of the bore-defining boss 44 beneath top hole 21, which boss is preferably an integral part of the cap portion, wherein such threads render it to be adapted to receive a threaded fixture, which in one preferred form of the invention may be an electric light or conduit, but may also be any article having an external male thread feature which is complementary to the threads on the inner wall of the boss 44 beneath hole 21 when so desired to be employed.

Figure 6B:
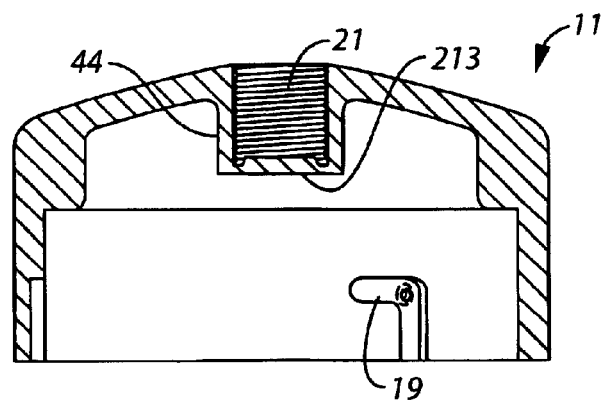
FIG. 6B is a side cutaway view of the cap portion of a junction box according to an alternate form of the invention.

FIG. 6B shows a side cutaway view of the cap portion 11 of a junction box according to an alternate form of the invention, showing the preferred shape of the angled channel portion 19, which is a depression in the interior surface of the cap portion 11, and a top hole 21, which optional top hole may contain a knock out 213 which comprises the floor portion of boss 44. An alternative embodiment of the invention employs threads on the inner surface of the walls of the bore-defining boss 44, which boss is preferably an integral part of the cap portion, wherein such threads render it to be adapted to receive a threaded fixture, which in one preferred form of the invention may be an electric light or conduit, but may also be any article having an external male thread feature which is complementary to the threads on the inner wall of the boss 44 beneath hole 21 when so desired to be employed.

Figure 7A:
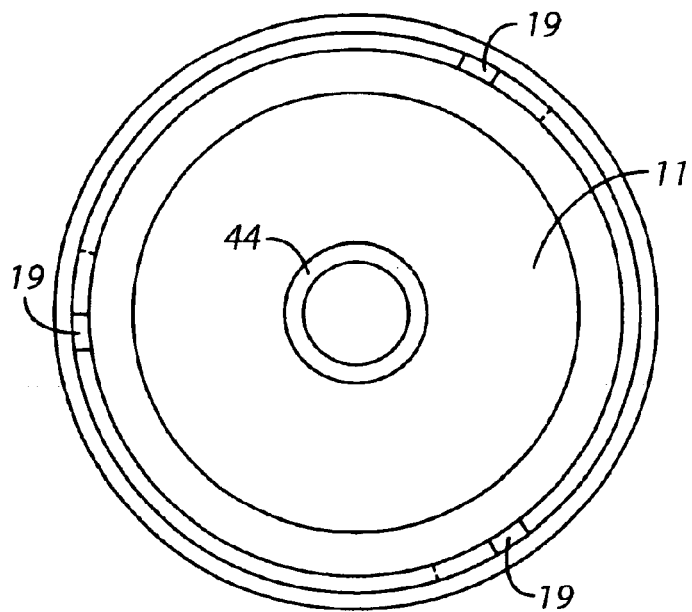
FIG. 7A is an underside view of the cap portion of a junction box according to one form of the invention.

FIG. 7A is an underside perspective view of a cap portion 11 according to a preferred form of the invention, showing the location of boss 44, and the angled channels 19 in a preferred embodiment employing three angles channels. However, the present invention contemplates the use of any number of channels between 2 and 12, inclusive.

Figure 7B:
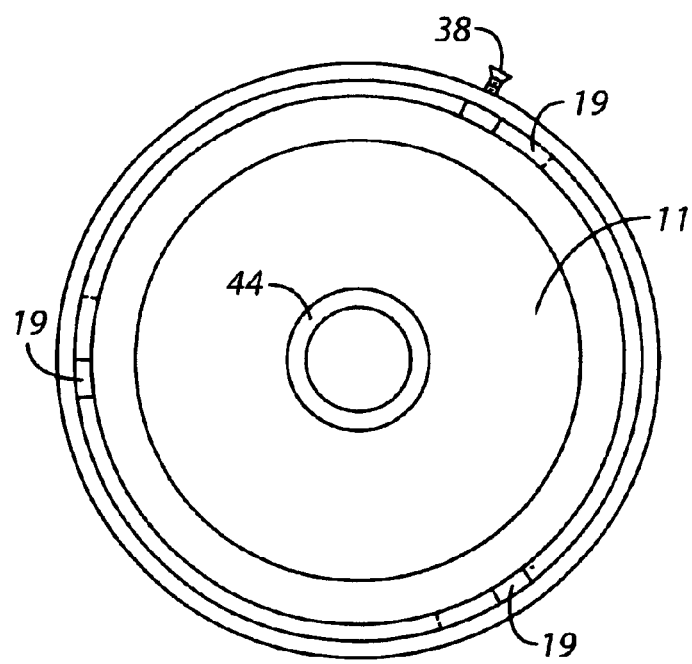
FIG. 7B is an underside view of the cap portion of a junction box according to an alternate form of the invention.

FIG. 7B is an underside perspective view of a cap portion 11 according to an alternate form of the invention, showing the location of boss 44, and the angled channels 19 in an alternate embodiment further employing a locking means, which in this embodiment is a screw 38 disposed in a bore that extends through the side wall portion of the cap portion 11 at the location of the bend B in the angled channel 19 (FIG. 3). However, any other obstruction within the bore which prevents movement of the protruding pins within the angled channel in which it is disposed is functionally equivalent thereto, including pins, rods, etc. In operation, the cap portion 11 is placed atop the enclosure 7 and subsequently twisted sufficiently to cause the protruding pins 15 to engage into the angled channels. Then the locking screw 38 is disposed in its bore through the side wall portion of the cap 11 at the location of bend B in the angled channel 19 (FIG. 3). Such an arrangement prevents removal of the cap portion 11 without first removing the locking screw 38. This is especially beneficial to keep children from accessing the contents of the enclosure, especially when the locking screw, which may be any conventional screw type, is selected to be an recessed hex head cap screw.

Figure 8:
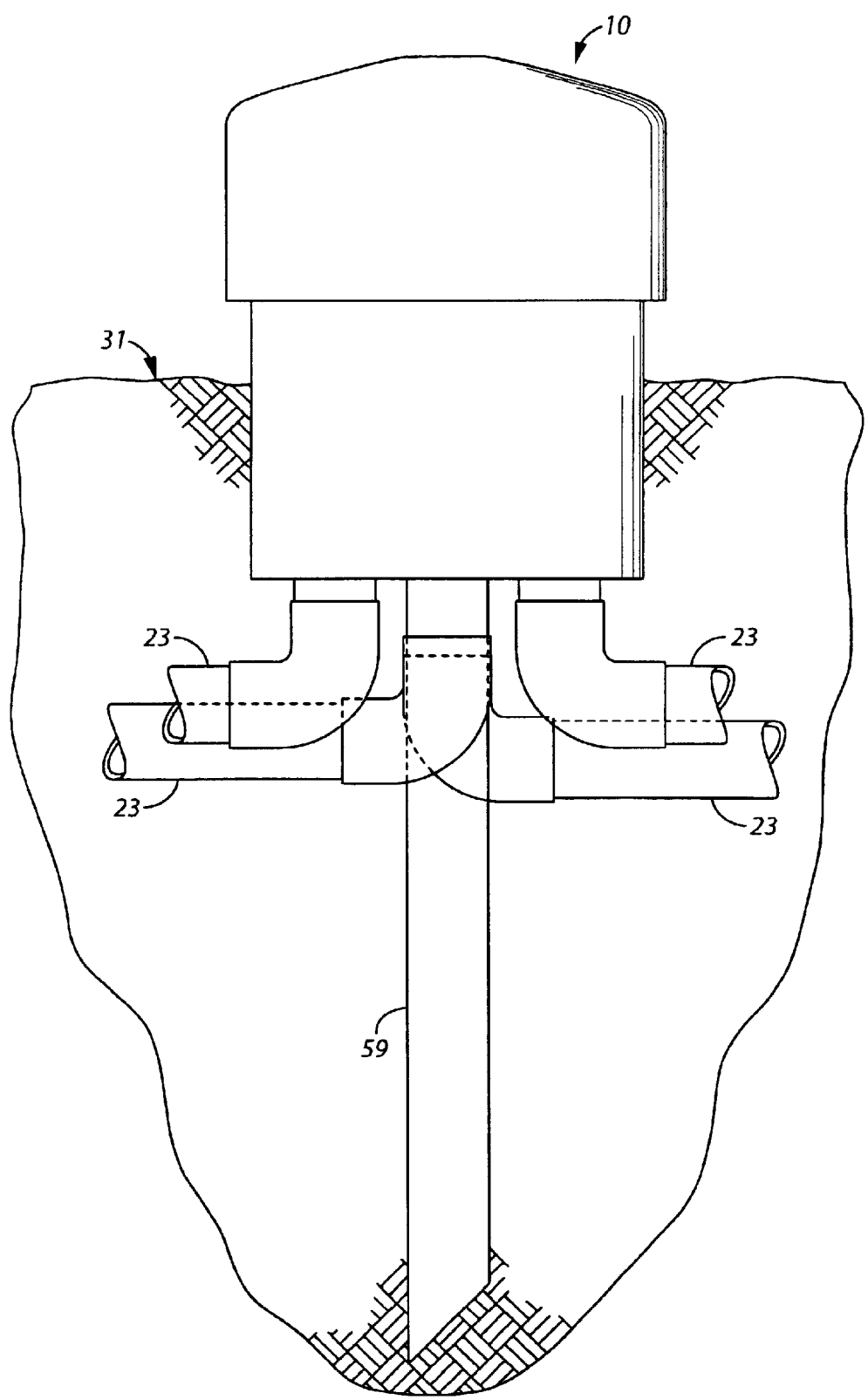
FIG. 8 shows an enclosure according to the invention buried beneath the ground in its use.

FIG. 8 shows a junction box 69 according to the invention disposed in a semi-subterranean location, with only the cap portion accessible to a passer by, and with the enclosure portion nearly completely buried beneath the ground level 31, and showing the location of electrical conduits 23 within the ground. There is a center stabilizer conduit 59, which may be any rod-shaped construct, but is according to one preferred form of the invention a piece of conduit which has been cut to a point at one of its ends to enable it to be easily driven into the ground, and whose other end is rigidly affixed to the enclosure portion at the center mount boss 5. In one preferred embodiment the inner walls of the center mount boss 5 are threaded, and the center stabilizer conduit 59 is simply screwed in to the boss 5. Such a stabilizer conduit 59 provides an anchoring means which is especially useful when only one or two conduits are used in the conduit receiver bosses.

Although the present invention has been described as comprising three protruding pins 15 disposed on the enclosure portion which are adapted and located to mate with the angled groove portions on the cap portion, the present invention contemplates the use of other functionally equivalent means for securing the cap portion of the invention to the enclosure portion of the invention, including the use of numbers of pins and grooves other than three, such as, for example and without limitation, any number of pins and grooves between 2 and 20, including 2 and 20, or screw-on configuration involving complementary threaded portions on the cap and enclosure, etc.

Although the present invention has been described as comprising four conduit receiving bosses in the lower surface of the enclosure portion (excluding the center mount boss), the present invention contemplates the use of any number of such conduit receiving bosses between 1 and 10, including 1 and 10.

While a junction box according to the invention has been described as comprising an enclosure portion and a cap portion which engage with one another by virtue of protruding pins on the outer surface of the enclosure and grooved channels within the inner surface of the cap portion, the present invention should not be construed as being limited by the means by which the cap and enclosure portions have been described as being engaged to one another. It is within the scope of the invention to employ other complementary closure means which cooperatively function to sealingly attach said cap portion to said enclosure portion to provide an enclosure/cap construction, by disposing one component of a complementary closure means on each of said cap and enclosure portions. Thus, the present invention includes the use of straps, clamps, snaps, hitches, hinges, screws, rivets and all other means for fastening an enclosure portion, as herein defined, to a cap portion, as herein defined.

Preferably, a junction box according to the invention is generally cylindrically-shaped, although it is within the scope of the invention to employ geometries other than cylindrical, such as square, rectangular, triangular, etc. Preferably, the longest length dimension of a junction box according to the present invention is any value in the range of between 3 and 24 inches with a length of about 12 inches being most preferred. The longest width, or as is more convenient to state, cross-sectional dimension (diameter when enclosure is cylindrical, the diagonal when the enclosure is square or rectangular) is any value in the range of between 2 and 24 inches with a length of about 9 inches being most preferred.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

I claim:

1. A junction box useful for containing electrical connections comprising:
   a) a substantially cylindrical enclosure portion having a bottom surface portion, a wall portion having an inner surface and an outer surface, said wall portion defining the outer diameter of said enclosure, said wall portion further comprising a top edge portion, and further comprising:
      i) a plurality of conduit receiver bosses having knockout provisions disposed on said bottom surface portion;
      ii) a center mount boss disposed on said bottom surface portion;
      iii) a plurality of protruding pins disposed on the outer surface of said wall portion of said enclosure portion;
      iv) a seal means annularly disposed about said wall portion at the top edge portion of said enclosure;
   b) a cap portion having a top portion and a wall portion, wherein said wall portion comprises an interior side and an exterior side, said cap portion comprising a cylindrically-shaped inner bore defined by the interior side of said wall portion, which bore is of greater diameter than the outer diameter of the wall of said enclosure portion, said cap portion including a plurality of angled channels on its inner surface which are adapted to receive said protruding pins, said angled channels each comprising a bend, wherein said cap portion is disposed about said enclosure portion so that said protruding pins are disposed within said angled channels.

2. A junction box according to claim 1 wherein said center mount boss is centrally disposed on said bottom surface portion of said enclosure portion.

3. A junction box according to claim 2 further including a central stabilizer shaped substantially in the form of a rod having a first end portion and a second end portion, wherein said first end portion of said central stabilizer is disposed with said mount boss.

4. A junction box according to claim 3 wherein said second end portion of said central stabilizer has a pointed tip.

5. A junction box according to claim 1 wherein said conduit receiver bosses are evenly spaced radially from one another with respect to the center of said bottom surface portion of said enclosure portion.

6. A junction box according to claim 1 wherein said seal means comprises an o-ring.

7. A junction box according to claim 6 wherein said o-ring is disposed at a point of junction of said enclosure portion and said cap portion so as to provide a watertight seal between the space within said enclosure and the external surroundings.

8. A junction box according to claim 6 wherein said o-ring is disposed on an annular ledge disposed the top edge portion of said wall portion of said enclosure.

9. A junction box according to claim 6 wherein said o-ring is disposed on an annular groove disposed the top edge portion of said wall portion of said enclosure.

10. A junction box according to claim 1 further comprising a bore disposed through the side wall of said cap portion at a location corresponding to the bend of one of said plurality of angled channels, and further comprising a locking means disposed through said bore sufficient to prevent said cap portion from being removed from said enclosure while said locking means is disposed within said bore by virtue of said locking means preventing one of said protruding pins from moving out of the angled channel in which it is disposed.

11. A junction box according to claim 10 wherein said locking means is a screw.

12. A junction box according to claim 1 wherein the top portion of said cap portion includes a hole disposed through its surface.

13. A junction box according to claim 12 wherein said hole comprises a boss that is adapted to receive a conduit.

14. A junction box according to claim 13 wherein said boss includes threads on its inner surface.

15. A junction box according to claim 13 wherein said hole is a bore having a floor portion which comprises a knock-out.

16. A junction box according to claim 12 wherein said hole is covered by a knock-out which is flush with the top surface of said cap portion.

17. A junction box useful for containing electrical connections comprising:
 a) a substantially cylindrical enclosure portion having a bottom surface portion, a wall portion having an inner surface and an outer surface, said wall portion defining the outer diameter of said enclosure, said wall portion further comprising a top edge portion having an annular ledge, and further comprising:
  i) a plurality of conduit receiver bosses having knock-out provisions disposed on said bottom surface portion;
  ii) a center mount boss disposed on said bottom surface portion;
  iii) a plurality of protruding pins disposed on the outer surface of said wall portion of said enclosure portion;
  iv) a seal means comprising an o-ring that is disposed on said annular ledge;
 b) a cap portion having a top portion and a wall portion, wherein said wall portion comprises an interior side and an exterior side, said cap portion comprising a cylindrically-shaped inner bore defined by the interior side of said wall portion, which bore is of greater diameter than the outer diameter of the wall of said enclosure portion, said cap portion including a plurality of angled channels on its inner surface which are adapted to receive said protruding pins, said angled channels each comprising a bend, wherein the top portion of said cap portion further includes a hole disposed through its surface, said hole comprising a bore, wherein said bore has a floor portion which comprises a knock-out, wherein said cap portion is disposed about said enclosure portion so that said protruding pins are disposed within said angled channels.

18. A junction box according to claim 17 further comprising a bore disposed through the side wall of said cap portion at a location corresponding to the bend of one of said plurality of angled channels, and further comprising a locking means disposed through said bore sufficient to prevent said cap portion from being removed from said enclosure while said locking means is disposed within said bore by virtue of said locking means preventing one of said protruding pins from moving out of the angled channel in which it is disposed.

19. A junction box in which an electrical conductor may be protected from wet surroundings which comprises:
 A) an enclosure portion having an outer surface. wherein said enclosure portion includes:
  a) a plurality of conduit-receiving bosses;
  b) a means for anchoring said enclosure portion to the earth;
 B) a cap portion comprising:
  a) a hole disposed through its surface.
said enclosure portion and said can portion each comprising a portion each of a complementary closure means which cooperatively function to sealingly attach said cap portion to said enclosure portion to provide an enclosure/cap construction, wherein said construction further comprises a gasket means for sealing the inner chamber defined by said cap and enclosure from the external surroundings in a waterproof fashion. wherein said complementary closure means comprises protruding pins disposed on the outer surface of said enclosure, and wherein said cap portion includes a channel which is adapted to receive said pins in a locking fashion.

* * * * *